T. GARE.
PROCESS OF MANUFACTURING CONTINUOUS LENGTHS OF VULCANIZED RUBBER COMBINED WITH EBONITE.
APPLICATION FILED MAR. 26, 1912.
1,146,699.
Patented July 13, 1915.
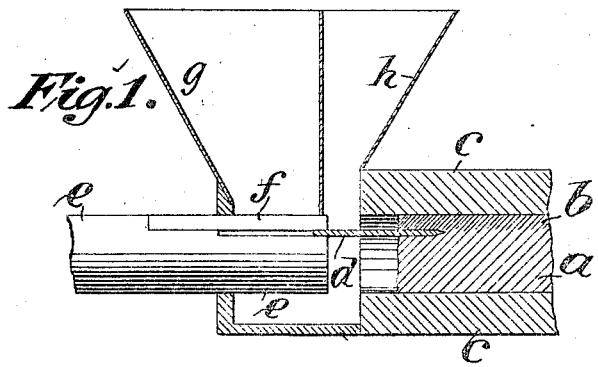
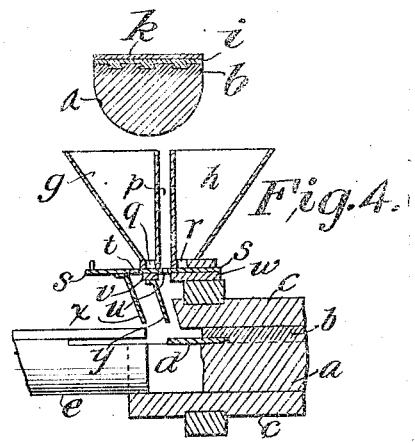
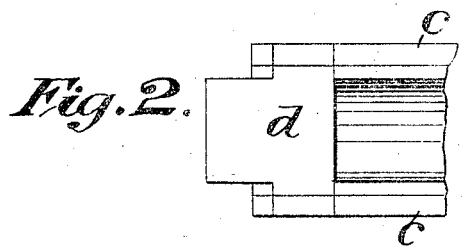
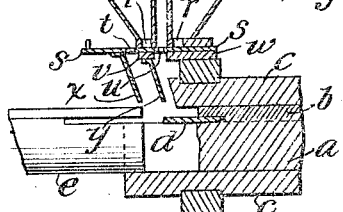
Witnesses:
Nannie Meem
Ruth Shure
Inventor
Thomas Gare
Per Mason Fenwick & Lawrence
Attorneys

UNITED STATES PATENT OFFICE.

THOMAS GARE, OF BIRMINGHAM, ENGLAND.

PROCESS OF MANUFACTURING CONTINUOUS LENGTHS OF VULCANIZED RUBBER COMBINED WITH EBONITE.

1,146,699.　　　　　Specification of Letters Patent.　　Patented July 13, 1915.

Application filed March 26, 1912.　Serial No. 686,322.

*To all whom it may concern:*

Be it known that I, THOMAS GARE, subject of the King of Great Britain, residing at Birmingham, in the county of Warwick, England, have invented certain new and useful Improvements in Processes of Manufacturing Continuous Lengths of Vulcanized Rubber Combined with Ebonite; and I do hereby declare the following to be a full, clear, and exact description of the invention, such as will enable others skilled in the art to which it appertains to make and use the same.

My invention relates to the process of manufacturing continuous lengths of vulcanized rubber combined with ebonite.

This invention has for its object to provide a process for the manufacture of continuous lengths of vulcanized rubber combined with ebonite (*i. e.* soft and hard rubber), whereby such articles can be produced more expeditiously and uniformly than hitherto has been the case.

According to this invention, the powdered rubber and the powdered ebonite (or its equivalent, powdered rubber mixed with sulfur) are separately fed into the mouth of the mold and kept isolated until most of the air is expelled by the compression, when the two separate bodies come into contact within the mold and become fully compressed as they travel onward as one body for partial or complete fusion or conversion in the heated part of the mold.

In the accompanying drawing Figure 1 is a vertical longitudinal section of so much of the apparatus as is necessary for the understanding of the invention. Fig. 2 is a plan view of the lower portion of the mold (the top portion being removed) the mold being designed for the production of motor-bus tires of the type shown in Fig. 3 in which an inextensible metal band is incorporated in the base of the tire and covered on both sides with hard rubber or ebonite. Fig. 4 shows one form of mechanism for supplying the rubber and ebonite in the desired proportions.

Similar letters refer to similar parts throughout the several views.

Referring to Figs. 1, 2 and 3, the rubber body *a* of the tire and its hard rubber or ebonite base *b* are manufactured first by compressing the rubber part *a* and the ebonite part *b* separately but simultaneously in the mold and then permitting the two parts to come together before the final compression and become inseparably united as a result of the process hereinbefore referred to. For this purpose, the mouth of the mold *c* is provided with a separating plate or table *d* and the ram *e* is divided or bifurcated so as to work upon both sides of the plate or table. Preferably the ram is formed as shown in Fig. 1 with the upper part cut away and a tongue *f* attached to serve as the upper ram.

The powdered rubber is fed to the open end or mouth of the tubular mold through a suitable hopper *g* and the powdered ebonite, or its equivalent, is fed through a separate channel or hopper *h* to the upper side of the plate or table *d*, so that each stroke of the twin ram *e*, *f* carries forward the charges and compresses them against the previously compressed charges in the mold. The plate or table *d* may extend any suitable distance into the mold so long as it permits the two bodies *a* and *b* to come into contact before they reach the heated part of the mold; in practice, it is found convenient to have the plate or table extending a distance a little farther (say a quarter or half an inch) than the limit reached by the ram.

As the molded tire is extruded from the apparatus, it is preferably wound upon a drum or otherwise given a curvature approximating that of the wheel for which the tire is designed. The mold for the above mentioned tire is designed to produce a longitudinal groove or grooves or rabbeted surface such as shown in Fig. 3 in the base of the tire of a width to receive the correspondingly formed metal ring or band *i*. A length of molded bus tire being cut off and a suitable joint prepared, spliced or otherwise, it is placed in a circular tire mold with the metal or band, and compressed so as to expel the air and bring the parts and joint into close contact, and then subjected to a temperature as described in Patent No. 967751. Or the joint may be welded before the tire is placed in said circular tire mold.

Preferably the metal band *i* is previously prepared by having its inner and outer surfaces coated with rubber solution and lightly dusted with powdered ebonite or rubber. A thin layer *k* of ebonite or its equivalent may be applied to the inner side of the ring or band during or prior to the circular tire molding process, to serve the purpose of packing and thus to insure the band seating itself firmly upon the rim of the wheel.

The table *d* need not be flat as shown, as it can be angular, curved or corrugated in cross section to suit the section of the tire or those of the rubber and ebonite parts thereof.

In order to obtain a feed which will regularly and accurately supply the requisite proportions of soft rubber and hard rubber, or ebonite, I may employ the mechanism shown in Fig. 4.

The two hoppers *g* and *h* are divided by a space *p* and each provided with a bottom having a hole *q* and *r* respectively. A slide *s* is provided below the said bottoms, and has two holes *t* and *u*. This slide rests on the parts *v* and *w*. When the slide *s* is reciprocated the holes *t* and *u* come into register with the holes *q* and *r* and the two kinds of material fill the former holes, whereupon the material in these holes *t* and *u* is carried beyond the parts *v* and *w* and falls either below or above the dividing plate *d* in accordance with the positions of the guide plates *x* and *y*. By altering the size of the holes *t* and *u* the two materials may be fed in any proportions. The holes *t* and *u* may be formed adjustable in size, as will be readily understood.

It will be understood that the invention is applicable for the manufacture of articles other than tires wherein continuous lengths of rubber combined with ebonite are required.

I claim:

1. The hereinbefore described process of manufacturing continuous lengths of vulcanized rubber combined with ebonite consisting of first separately feeding powdered rubber and ebonite powder to the inlet of a tubular single bore mold to take up separate superposed positions, then intermittently pressing the said two powders still separated from each other jointly into the said mold, then allowing the said two powders to come into contact with each other in their superposed positions and at the same time subjecting them to intermittent pressure to form a compact dense mass while cold and finally subjecting the said mass in the said mold to heat for complete fusion therein, substantially as and for the purpose specified.

2. The hereinbefore described process of manufacturing continuous lengths of vulcanized rubber combined with ebonite consisting of first intermittently separately feeding powdered rubber and ebonite powder in the requisite accurate relative proportions to the inlet of a tubular single bore mold to take up separate superposed positions, then intermittently pressing the said two powders still separated from each other jointly into the said mold, then allowing the said two powders to come into contact with each other in their superposed positions and at the same time subjecting them to intermittent pressure to form a compact dense mass while cold and finally subjecting the said mass in the said mold to heat for complete fusion therein, substantially as and for the purpose specified.

In testimony whereof I have affixed my signature in presence of two witnesses.

THOMAS GARE.

Witnesses:
 FERDINAND B. BOSSHARDT,
 STANLEY E. BRAMALL.